June 23, 1931.  H. S. HOLMES  1,811,500
WELDING SEGMENTS
Filed Jan. 23, 1929  2 Sheets-Sheet 1

Inventor
Henry S. Holmes.
By his Attorneys

June 23, 1931.  H. S. HOLMES  1,811,500
WELDING SEGMENTS
Filed Jan. 23, 1929   2 Sheets-Sheet 2
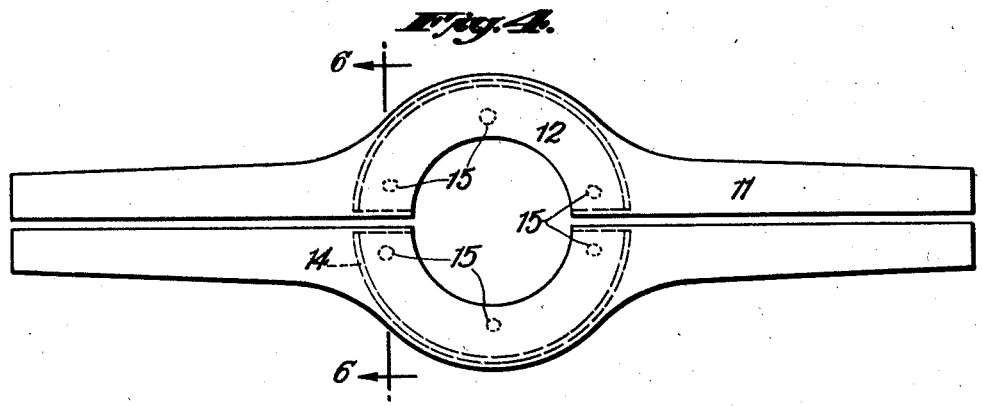
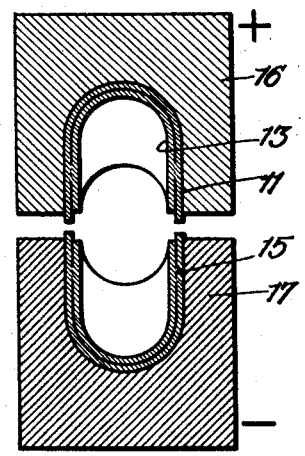
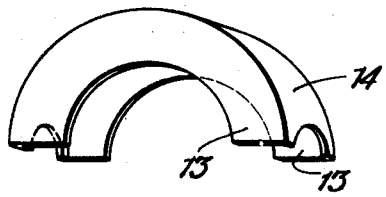
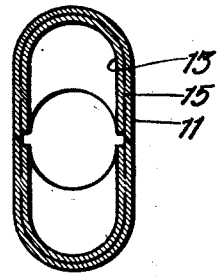
Inventor
HENRY S. HOLMES.
By His Attorneys Patented June 23, 1931

1,811,500

UNITED STATES PATENT OFFICE

HENRY S. HOLMES, OF NEW YORK, N. Y., ASSIGNOR, BY MESNE ASSIGNMENTS, TO METROPOLITAN ENGINEERING COMPANY, OF BROOKLYN, NEW YORK, A CORPORATION OF NEW YORK

WELDING SEGMENTS

Application filed January 23, 1929. Serial No. 334,379.

In prior patents there are described apparatus and methods for electrically welding the segments of a hollow object. See for example Murray Patents Nos. 1,333,274 of March 9, 1920 and 1,492,258 of April 29, 1924. In such operations, particularly with thin segments and heavy currents, it is difficult to secure a perfect register of the edges and to maintain the register during the entire operation so that the resulting joint will be perfect. The vibration caused by the jolt of the passing current and the pressure of the segments toward each other tends to throw the edges out of line.

In the present invention the edges are braced or steadied by internal means which are permanently united to the segments.

The accompanying drawings illustrate embodiments of the invention.

Fig. 4 is a side elevation of two segments of an axle housing;

Fig. 5 is a perspective view of one of the internal braces;

Fig. 6 is a section on the line 6—6 of Fig. 4 with the electrodes applied;

Fig. 7 is a similar section of the finished housing.

Figure 1:
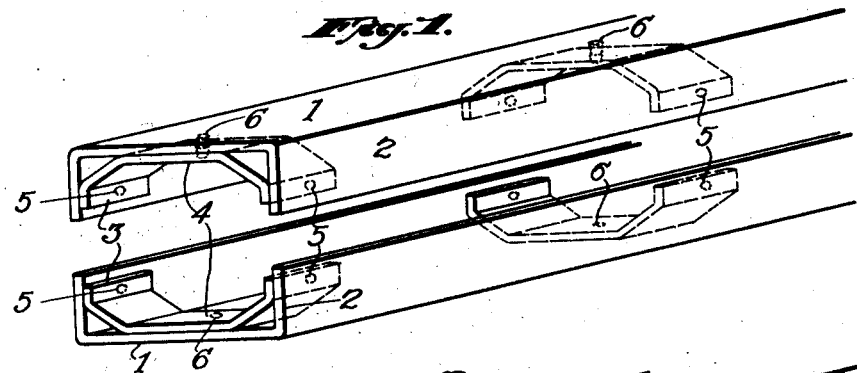
Fig. 1 is a perspective view of two segments of a hollow structural member before welding.

The segments of Fig. 1 are stamped and bent from thin sheet metal to form central portions 1 and side portions 2, the edges of which are to be butt welded by a resistance method such as that of Murray Reissue Patent No. 15,466 of October 10, 1922, by the passage of current of extremely high amperage for a brief period of time. It is this current chiefly which tends to vibrate the free edges of the segments and to leave them out of alignment when the weld is completed.

To rigidify and hold the edges in position during the welding, I provide internal stiffeners at intervals, such as the straps shown with portions 3 as near the edges as possible, allowing for a certain take-up of metal, connected by an intermediate portion 4. These straps are fixed in place within the segments as for example by spot welds 5 and 6.

The stiffeners should not cross the line of the weld. If the ends of the opposite stiffeners were brought into contact even toward the end of the welding operation, they would provide a short circuit path for the current, which would lessen the efficiency of the operation.

Figure 2:
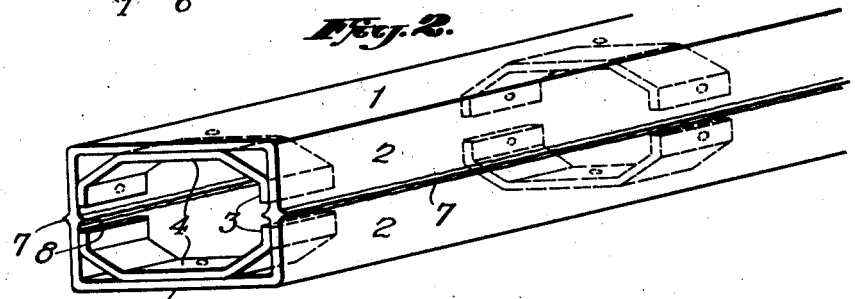
Fig. 2 is a similar view after welding.
Figure 3:
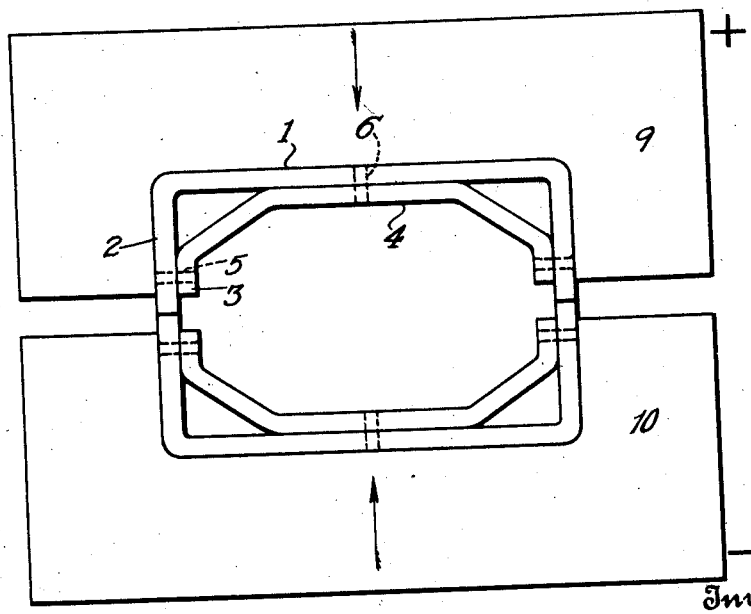
Fig. 3 is an end view of the welding operation.

When the parts are pressed together and the current passed, the metal taken up is extruded in fins 7 and 8 (Fig. 2) which can be afterwards trimmed off. Fig. 3 shows the electrodes 9 and 10 closely embracing the outside of the edge portions 2 so as with the stiffeners 3 to hold the edges rigid. With structural members like that of Fig. 2 the stiffeners are set at the ends where there is the greatest tendency to vibration and, according to the length of the product, at suitably spaced intermediate points. The portions 3 of the stiffeners would alone serve the purpose, but their application in proper position is facilitated by making them the ends of a strap connected by the intermediate portion 4 which is also welded to the segment.

The axle housing segments of Fig. 4 comprise tubular end portions 11 bent out at the centre to form annular portions 12. The stiffening is required chiefly at the free inner ends of the tubular portion at the transverse circular opening. In that case I propose to use stiffeners of the annular shape shown in Fig. 5 with side portions 13 and a connecting peripheral portion 14. The side portions are spot welded as at 15 to the inside of the segments.

When the electrodes are applied (Fig. 6) the edge portions 11 of the segments are embraced by the electrodes 16 and 17 and stiffened on the inside by the sides 13 of the stiffeners. The finished product with the extruded fins removed is illustrated in Fig. 7.

The articles manufactured by this process have not only the advantage of accurate registration of the thin edges at the joint, but have also the advantage of being braced by the internal stiffeners against the strains of use. The stiffeners, being united to the shell, assist the latter in taking up and distributing any external stresses applied.

Various modifications may be made by those skilled in the art without departing from the invention as defined in the following claims.

1. The method of making a hollow article of sheet metal segments which consists in first applying and uniting stiffeners to the inside of the segments near their edges, then assembling and pressing the edges of said segments together between electrodes and passing a welding current.

2. The method of making a hollow article of sheet metal segments which consists in first applying and uniting stiffeners to the inside of the segments near their edges, then assembling the segments between electrodes embracing the same and extending nearly to their edges and pressing the parts together while passing a welding current between the electrodes and across the joint.

In witness whereof, I have hereunto signed my name.

HENRY S. HOLMES.